US010556539B1

(12) United States Patent
Brown

(10) Patent No.: US 10,556,539 B1
(45) Date of Patent: Feb. 11, 2020

(54) TAILGATE INDICATOR LIGHT

(71) Applicant: Trevor G. Brown, Whitecourt (CA)

(72) Inventor: Trevor G. Brown, Whitecourt (CA)

( * ) Notice: Subject to any disclaimer, the term of this patent is extended or adjusted under 35 U.S.C. 154(b) by 0 days.

(21) Appl. No.: 16/152,781

(22) Filed: Oct. 5, 2018

Related U.S. Application Data

(60) Provisional application No. 62/568,357, filed on Oct. 5, 2017.

(51) Int. Cl.
B60Q 9/00 (2006.01)
B60R 16/027 (2006.01)

(52) U.S. Cl.
CPC .............. *B60Q 9/00* (2013.01); *B60R 16/027* (2013.01); *E05Y 2900/546* (2013.01)

(58) Field of Classification Search
CPC .... B60Q 9/00; B60R 16/027; E05Y 2900/546
USPC ........................................................ 340/457
See application file for complete search history.

(56) References Cited

U.S. PATENT DOCUMENTS

| 5,289,534 | A | 2/1994 | Lester et al. |
| 5,656,990 | A | 8/1997 | Schwimmer |
| 5,656,992 | A * | 8/1997 | McNeill ................... B60Q 1/54 340/441 |
| 5,828,299 | A | 10/1998 | Chen |
| 6,065,423 | A | 5/2000 | Hensel |
| 6,137,419 | A | 10/2000 | Lennox et al. |
| 6,727,806 | B1 | 4/2004 | Massie et al. |
| 6,786,623 | B2 * | 9/2004 | Snyder ..................... B60Q 3/30 362/485 |
| 7,625,031 | B2 * | 12/2009 | Ohly ................... B62D 33/0273 296/50 |
| 7,834,750 | B1 * | 11/2010 | Hertz ................... B60Q 1/2692 340/468 |
| 8,410,921 | B1 * | 4/2013 | Lewis ..................... B60K 35/00 340/457 |
| 8,907,777 | B2 * | 12/2014 | Greer ....................... B60Q 9/00 340/438 |
| 9,061,627 | B2 | 6/2015 | Ariemma et al. |
| D749,439 | S | 2/2016 | Thur |
| 2019/0009718 | A1 * | 1/2019 | Copen ................... G01S 13/931 |

* cited by examiner

*Primary Examiner* — John A Tweel, Jr.
(74) *Attorney, Agent, or Firm* — Cramer Patent & Design, PLLC; Aaron R. Cramer

(57) ABSTRACT

A tailgate indicator light device comprises a sensor mounted adjacent an existing tailgate bolt configured to communicate wirelessly with an alert module. The alert module is capable of being mounted to a vehicle dashboard and comprises a plurality of illumination means. The sensor and module may be powered by the electrical system of the vehicle or a rechargeable battery. A USB port is disposed within the housing of the alert module. The device is configured to visually communicate to a user the open or closed status of the tailgate of a vehicle into which the device is installed.

19 Claims, 4 Drawing Sheets

TAILGATE INDICATOR LIGHT

RELATED APPLICATIONS

The present invention is a continuation of and claims the benefit of U.S. Provisional Application No. 62/568,357 filed on Oct. 5, 2017, the entire disclosures of which are incorporated herein by reference.

FIELD OF THE INVENTION

The present invention relates generally to the field of tailgate indicator lights for trucks.

BACKGROUND OF THE INVENTION

With sales at an all-time high, the popularity of the pick-up style truck as an everyday vehicle is wider spread than it ever has been. Their utility and convenience in hauling items coupled with the availability of luxury interiors and extended cab space have made the pickup a popular alternative to other vehicles. However, one (1) particular aspect of a pickup truck operation which is difficult to verify is the status or position of the tailgate, especially if a bed cover or cap is in place. This is in stark contrast to a conventional car in which it can be readily determined if a door is opened or not. Additionally, conventional cars provide indication through an illuminated dome light. However, the status of a tailgate on a pickup truck is not readily verifiable.

As such, many users may drive down the road with their pickup truck tailgate in the down position thus allowing contained objects to fall out. Such difficulty in tailgate status verification may also lead users to frequently stop, get out of the truck, walk around back, check the status of the tailgate, and then get back in. This of course wastes valuable time. Accordingly, there exists the need for means by which the positional status of a pickup truck tailgate can be readily and easily verified from the drivers seated position. The development of the tailgate position sensor for pickup trucks fulfills this need.

SUMMARY OF THE INVENTION

The inventor has recognized the aforementioned, inherent problems and lack in the art and observed that there is a need for a tailgate position sensor installed on a pickup truck comprising a sensor transmitter located in tailgate jamb area which generates a wireless signal and an alarm receiver which is designed to connect to a cigarette lighter plug. The alarm receiver is a portable device.

The wireless signal may interface with a personal electronic device capable of running a dedicated software application to provide remote indication as to a closed nature of the tailgate where a driver cannot view the tailgate when a cap or a cover is used over a bed area of the pickup truck. The installation of the sensor transmitter may not require physical modification to a tailgate jamb area of the pickup truck and may provide access to an interior sidewall area of the bed area of the pickup truck.

An outward facing end of the sensor transmitter may be provided with a drive means which may comprise a bolt head. The outward facing end of the sensor transmitter may be provided with a sensing head to detect the presence of the tailgate of the pickup truck when in a closed position. The sensing head may be selected from a group consisting of a limit switch, a proximity sensor, a magnetic switch, a capacitive sensor, or a hall effect sensor. The inward facing end of the sensor transmitter may be provided with an electrical connector.

The tailgate position sensor may also comprise a wiring adapter which electrically and mechanically connects to the electrical connector and provides 12-volt direct current power to the sensor transmitter. The wiring adapter may allow for interconnection to a pickup truck wiring harness. The electrical power for a transmitter circuit inside of the sensor transmitter may be obtained via the pickup truck wiring harness through the wiring adapter and the electrical connector. The sensing head is capable of interfacing with the transmitter circuit and the wireless signal is then transmitted to the personal electronic device as well as the alarm receiver. The alarm receiver may include a power supply which connects to either a 12-volt cigarette lighter plug or a 5-volt USB-style power source. The wireless signal may be Bluetooth wireless signal. The alarm receiver may be designed to connect to a cigarette lighter plug either directly or through a USB power adapter.

The sensor transmitter may be installed in place of an existing latch bolt provided in a tailgate jamb area. The transmitter may also be installed on a passenger side or driver's side of the pickup truck.

A receiver circuit may provide power to a high-intensity indicator light readily seen in bright sunlight for a non-closed tailgate or to alert the driver that the tailgate is missing. The tailgate position sensor may also comprise of a kit which includes the sensor transmitter, the alarm receiver and the tailgate position sensor.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
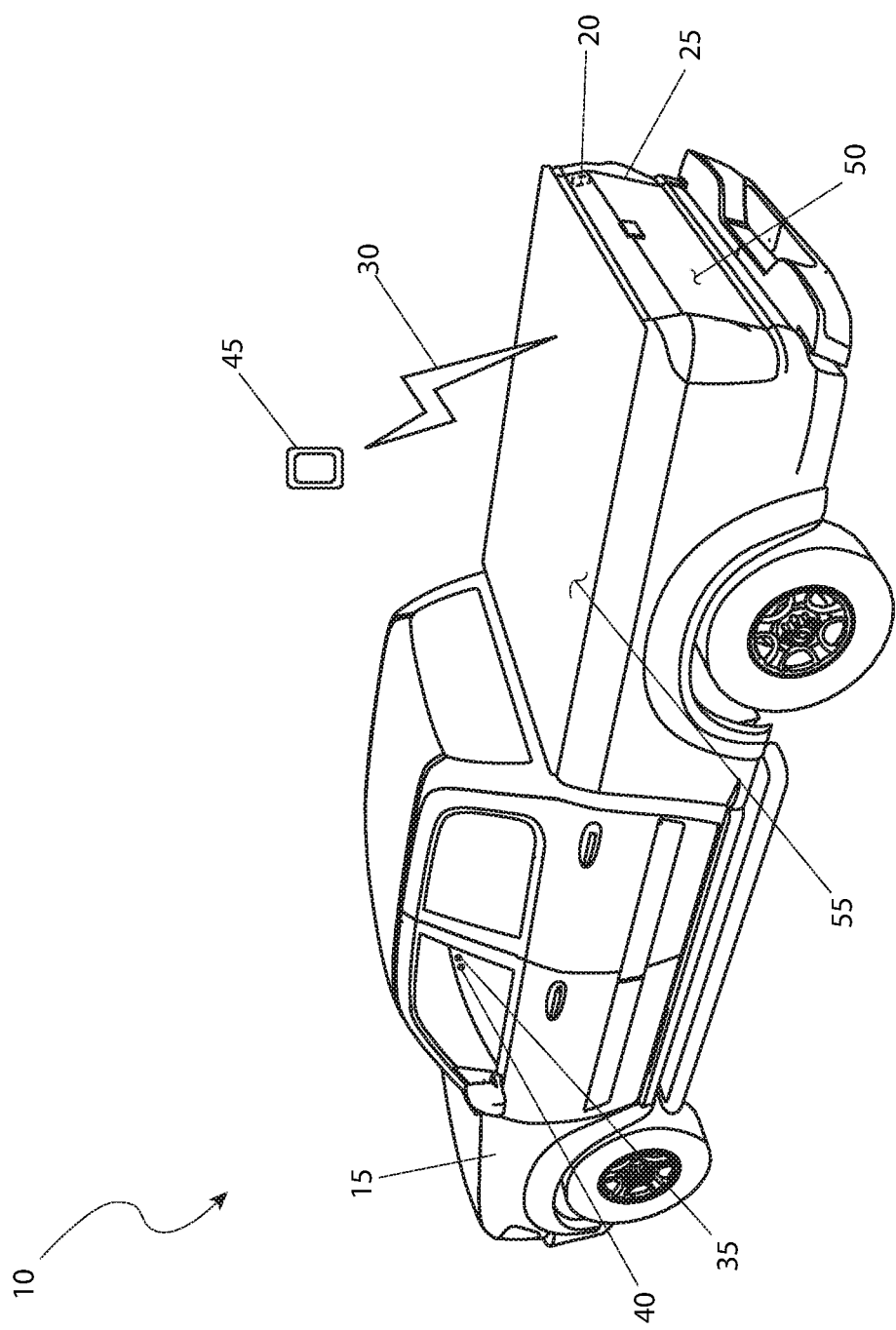
FIG. 1 is a perspective view of the tailgate position sensor 10 installed on a pickup truck 15, according to the preferred embodiment of the present invention.

DESCRIPTIVE KEY 10 tailgate position sensor
15 pickup truck
20 sensor transmitter
25 tailgate jamb area
30 wireless signal
35 alarm receiver
40 cigarette lighter plug
45 personal electronic device
50 tailgate
55 bed area
60 vehicle wiring harness
65 tail lights
70 threaded body 75 drive means
80 sensing head
85 electrical connector
90 wiring adapter
95 transmitter circuit
100 power supply
105 receiver circuit
110 indicator light

1. DESCRIPTION OF THE INVENTION

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Referring now to FIG. 1, a perspective view of the tailgate position sensor 10, installed on a pickup truck 15, according to the preferred embodiment of the present invention is disclosed. The tailgate position sensor (herein also described as the "device") 10, includes two (2) main components. The first is a sensor transmitter 20, located in tailgate jamb area 25, and is indicated by hidden lines due to its hidden nature. Further details and description will be provided herein below. The sensor transmitter 20 generates a wireless signal 30, such as Bluetooth®, which is transmitted to the second main component of the present invention, an alarm receiver 35. The alarm receiver 35 is a portable device designed to connect to a cigarette lighter plug 40, either directly or through a USB power adapter (not shown) depending on specific model or adaptation. Additionally, the wireless signal 30 may interface with a personal electronic device 45 running a dedicated software application or "app" to provide remote indication as to the closed nature of the tailgate 50. This indication is viewed as especially useful in situations where the driver cannot view the tailgate 50 such as when a cap or cover is used over the bed area 55.

Figure 2:
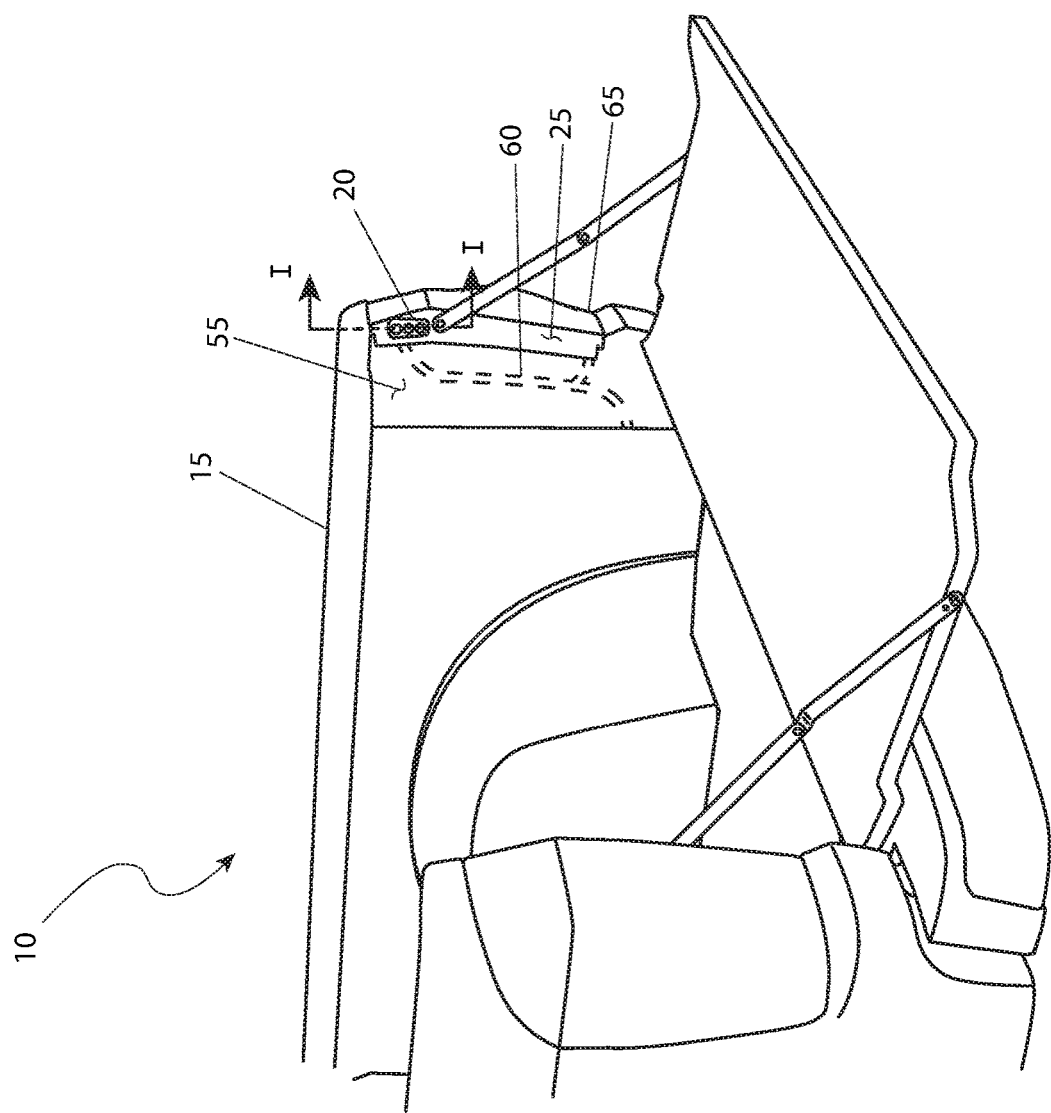
FIG. 2 is a detailed view of the sensor transmitter 20, as used with the tailgate position sensor 10, according to the preferred embodiment of the present invention.

Referring next to FIG. 2, a detailed view of the sensor transmitter 20, as used with the device 10, according to the preferred embodiment of the present invention is depicted. The sensor transmitter 20 is installed in place of the existing latch bolt as is typically provided in a tailgate jamb area 25. While FIG. 2 indicates installation on the passenger side of the pickup truck 15, it should be noted that it can be installed with equal success on the driver's side of the pickup truck 15, and as such, specific placement of the sensor transmitter 20, should not be interpreted as a limiting factor of the present invention. The installation of the sensor transmitter 20 does not require physical modification to the tailgate jamb area 25 and provides access to the interior sidewall area of the bed area 55. After physical installation, the sensor transmitter 20 interconnects to the vehicle wiring harness 60 (shown via hidden lines) that is routed to the tail lights 65 (partially shown) of the pickup truck 15. With proper preparation and experience, total installation time on an existing pickup truck 15 is envisioned to take fifteen minutes (15 min.) or less. Further detail on the electrical interconnection will be provided herein below.

Figure 3:
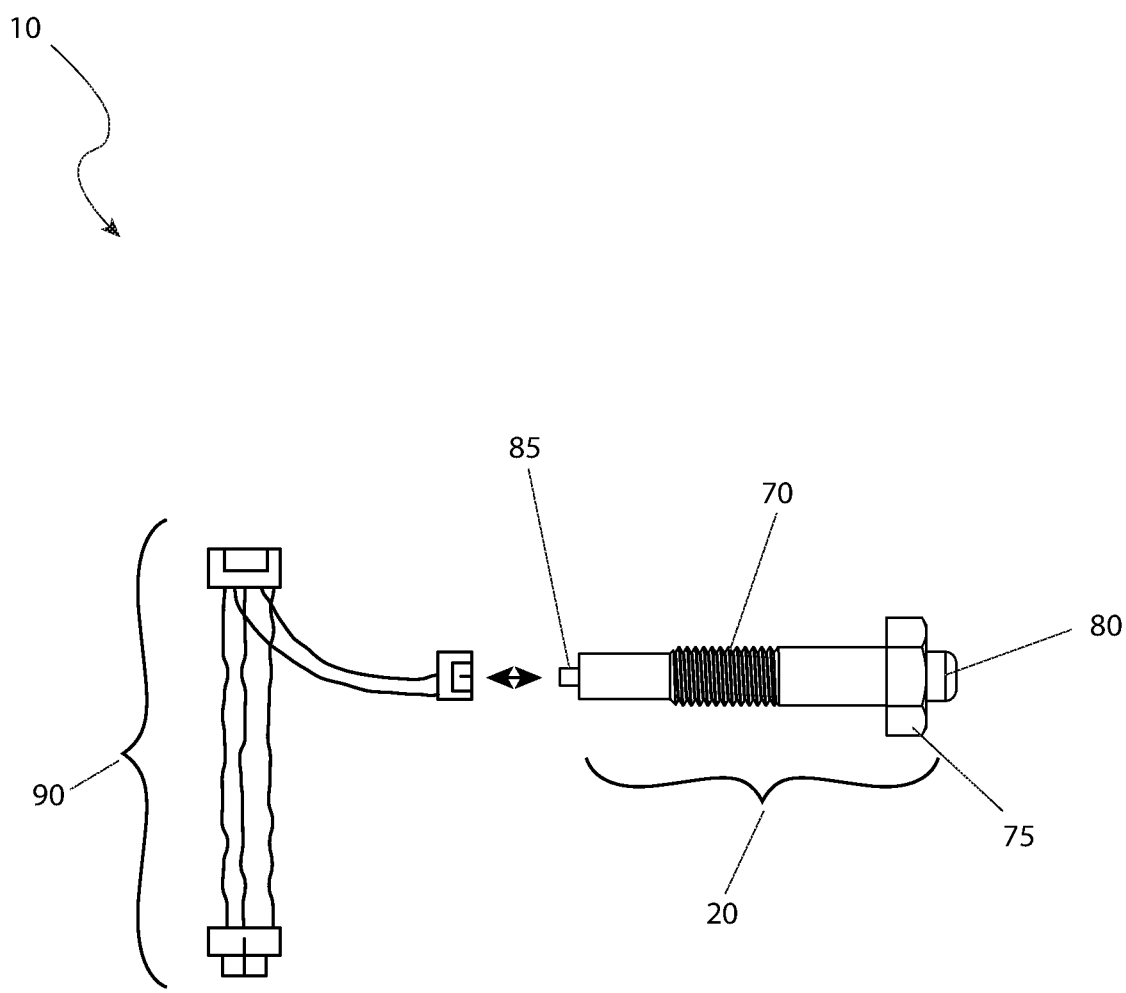
FIG. 3 is a sectional view of the sensor transmitter 20, as seen along a line I-I, as shown in FIG. 2, as used with the tailgate position sensor 10, according to the preferred embodiment of the present invention; and, FIG. 4 is an electrical block diagram of the tailgate position sensor 10, according to the preferred embodiment of the present invention.

Referring now to FIG. 3, a sectional view of the sensor transmitter 20, as seen along a line I-I, as shown in FIG. 2, as used with the device 10, according to the preferred embodiment of the present invention is shown. The sensor transmitter 20 is provided with a threaded body 70 that engages the existing threads provided for the existing latch bolt as described in FIG. 2. It is envisioned that different sizes and styles of sensor transmitter 20 would be necessary to accommodate all makes and models of pickup truck 15. The outward facing end of the sensor transmitter 20 is provided with a drive means 75, such as a bolt head or the like depending on specific needs. Additionally, the outward facing end of the sensor transmitter 20 is provided with a sensing head 80 to detect the presence of the tailgate 50 (as shown in FIG. 1) when in a closed position. The sensing head 80 is envisioned to be a limit switch, a proximity sensor, a magnetic switch, a capacitive sensor, a hall effect sensor or the like. The specific style of sensing transmitter 20 utilized by the device 10 should not be a limiting factor of the present invention. The inward facing end of the sensor transmitter 20 is provided with an electrical connector 85. Once installed, a wiring adapter 90 electrically and mechanically connects to the electrical connector 85 and provides 12-volt direct current (DC) power to the sensor transmitter 20. The wiring adapter 90 then allows for interconnection to the vehicle wiring harness 60 (as shown in FIG. 2).

Figure 4:
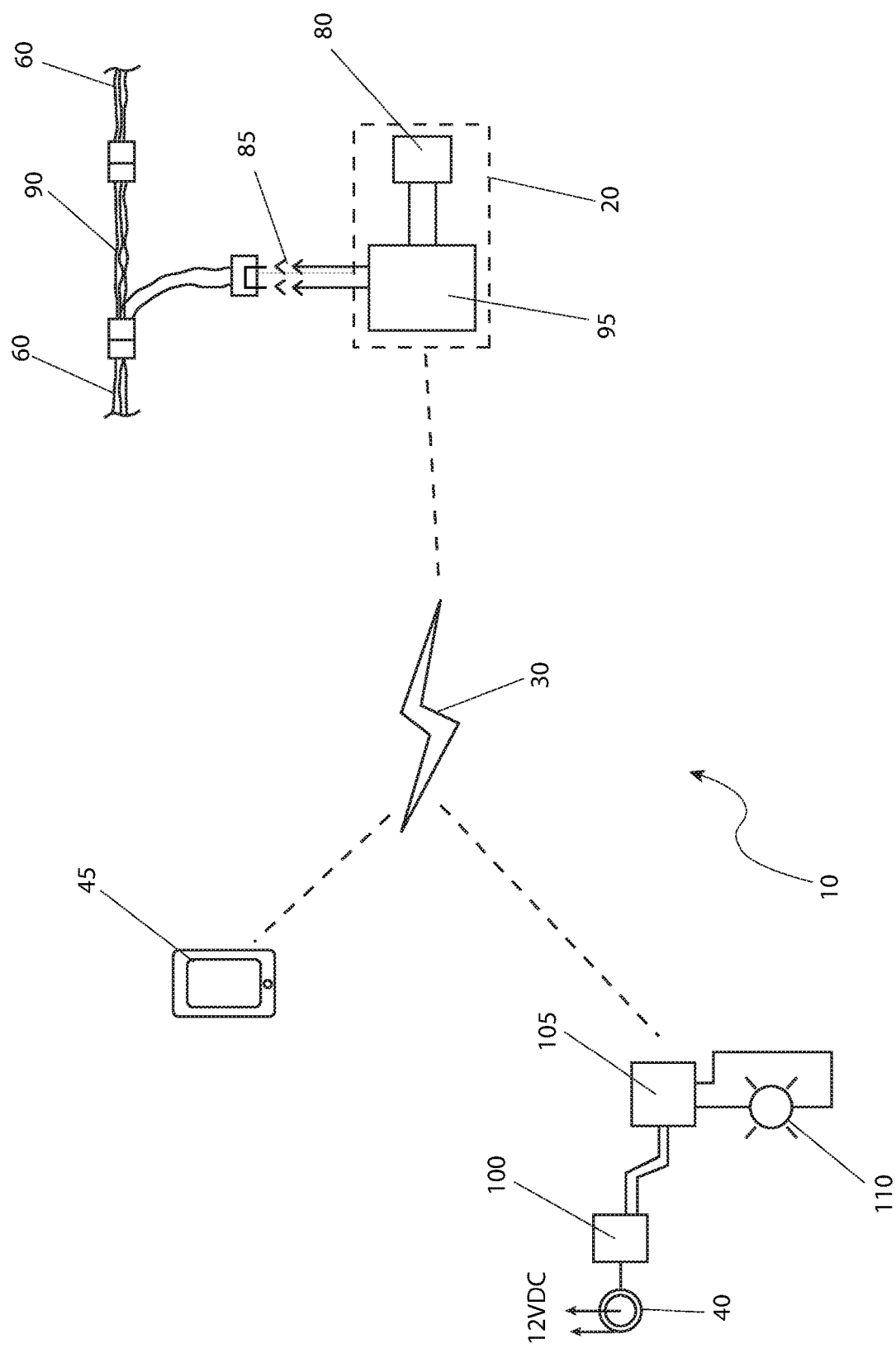

Referring finally to FIG. 4, an electrical block diagram of the device 10, according to the preferred embodiment of the present invention is disclosed. Electrical power for a transmitter circuit 95 inside of the sensor transmitter 20 is obtained via the vehicle wiring harness 60 through the wiring adapter 90 and the electrical connector 85. The sensing head 80 interfaces to the transmitter circuit 95. The resultant wireless signal 30 is then transmitted to the personal electronic device 45 as well as the alarm receiver 35. The alarm receiver 35 includes a power supply 100 which can connect to either a 12-volt cigarette lighter plug 40 or a 5-volt USB-style power source (not shown) depending on the motor vehicle. The power supply 100 provides power to a receiver circuit 105. In the event of a non-closed tailgate 50 (as shown in FIG. 1) the receiver circuit 105 will then provide power to a high-intensity indicator light 110 capable of being readily seen even in bright sunlight. As the system provides indication of the lack of tailgate 50 (as shown in FIG. 1) presence, the device 10 could also serve to alert the driver that the tailgate 50 (as shown in FIG. 1) may have been stolen as well.

The preferred embodiment of the present invention can be utilized in a simple and effortless manner with little or no training. It is envisioned that the device 10 would be constructed in general accordance with FIG. 1 through FIG. 4. The operator would procure the device 10 in a kit format including the sensor transmitter 20 and the alarm receiver 35 with particular attention to make and model compatibility.

After procurement and prior to utilization, the device 10 would be installed in the following manner: lower the tailgate 50, remove existing latch bolt, mechanically install the sensor transmitter 20 in place of latch bolt, remove corresponding tail lights 65, connect wiring adapter 90 to electrical connector 85, connect opposing ends of wiring adapter 90 to vehicle wiring harness 60, re-install tail lights 65, connect the alarm receiver 35 to a cigarette lighter plug 40 or corresponding USB power supply, install corresponding software on a personal electronic device 45, initiate electronic pairing, and verify operation.

During utilization of the device 10, the following procedure would be initiated: as the operator drives or otherwise operates the pickup truck 15, periodic glances at either the alarm receiver 35 for the presence of an illuminated indicator light 110 or by the alerting sound emanating from a personal electronic device 45 would alert the operator to the occurrence of an open tailgate 50. Should the open state not be desired, corrective action would then be taken.

After use of the device 10, it is simply deactivated by turning off the ignition of the pickup truck 15. This will deactivate both the sensor transmitter 20 and the alarm receiver 35. Upon operation of the ignition at a further date in time, the device 10 becomes operational again as described above in a cyclical manner.

The benefits of the device 10 are as follows: it is quick and easy to install, it provides obvious indication of an open tailgate 50 which is not readily identifiable from the driver's seat in many cases, it lasts the life of the vehicle, it can be moved to another vehicle if needed, it informs operator that unauthorized opening of the tailgate 50 is occurring, and it provides for enhanced protection and retention of objects in the bed area 55.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A tailgate position sensor installed on a pickup truck, comprising:
   a sensor transmitter located in tailgate jamb area, said sensor transmitter generates a wireless signal; and,
   an alarm receiver designed to connect to a cigarette lighter plug, said alarm receiver is a portable device and,
   wherein said sensor transmitter is installed in place of an existing latch bolt provided in a tailgate jamb area.

2. The tailgate position sensor according to claim 1, wherein said wireless signal interfaces with a personal electronic device running a dedicated software application to provide remote indication as to a closed nature of said tailgate where a driver cannot view said tailgate.

3. The tailgate position sensor according to claim 1, wherein installation of said sensor transmitter does not require physical modification to a tailgate jamb area of said pickup truck and provides access to an interior sidewall area of said bed area of said pickup truck.

4. The tailgate position sensor according to claim 1, wherein an outward facing end of said sensor transmitter is provided with a drive means.

5. The tailgate position sensor according to claim 4, wherein said drive means is a bolt head.

6. The tailgate position sensor according to claim 1, wherein said outward facing end of said sensor transmitter is provided with a sensing head to detect said presence of said tailgate of said pickup truck when in a closed position.

7. The tailgate position sensor according to claim 6, wherein said sensing head is selected from said group consisting of a limit switch, a proximity sensor, a magnetic switch, a capacitive sensor, or a hall effect sensor.

8. The tailgate position sensor according to claim 1, wherein said inward facing end of said sensor transmitter is provided with an electrical connector.

9. The tailgate position sensor according to claim 8, further comprises a wiring adapter electrically and mechanically connecting to said electrical connector and provides 12-volt direct current power to said sensor transmitter.

10. The tailgate position sensor according to claim 9, wherein said wiring adapter allows for interconnection to a pickup truck wiring harness.

11. The tailgate position sensor according to claim 10, wherein electrical power for a transmitter circuit inside of said sensor transmitter is obtained via said pickup truck wiring harness through said wiring adapter and said electrical connector.

12. The tailgate position sensor according to claim 1, wherein a sensing head interfaces to a transmitter circuit and said wireless signal is then transmitted to said personal electronic device as well as said alarm receiver.

13. The tailgate position sensor according to claim 12, wherein said alarm receiver includes a power supply which connects to either a 12-volt cigarette lighter plug or a 5-volt USB-style power source.

14. The tailgate position sensor according to claim 1, wherein said wireless signal is a Bluetooth wireless signal.

15. The tailgate position sensor according to claim 1, wherein said alarm receiver is designed to connect to a cigarette lighter plug either directly or through a USB power adapter.

16. The tailgate position sensor according to claim 1, wherein said sensor transmitter is installed on a passenger side of said pickup truck.

17. The tailgate position sensor according to claim 1, wherein said sensor transmitter is installed on a driver's side of said pickup truck.

18. The tailgate position sensor according to claim 1, further comprising a receiver circuit that provides power to an indicator light readily for a non-closed tailgate or to alert said driver that said tailgate is missing.

19. The tailgate position sensor according to claim 1, further comprising a kit including said sensor transmitter, said alarm receiver and said tailgate position sensor.

\* \* \* \* \*